(12) United States Patent
Zhang et al.

(10) Patent No.: US 11,840,468 B2
(45) Date of Patent: Dec. 12, 2023

(54) ROTATING CORED-TYPE BIOLOGICAL TREATMENT DEVICE OF LOW-CARBON-SOURCE WASTEWATER AND USAGE METHOD THEREFOR

(71) Applicant: Nanjing Institue of Environmental Sciences, Ministry of Ecology and Environment of the People's Republic of China, Jiangsu (CN)

(72) Inventors: Yimin Zhang, Nanjing (CN); Zhihao Li, Nanjing (CN); Xueting Xu, Nanjing (CN); Yuexiang Gao, Nanjing (CN); Yueming Zhu, Nanjing (CN); Ming Kong, Nanjing (CN); Tao He, Nanjing (CN)

(73) Assignee: Nanjing Institute of Environmental Sciences, Ministry of Ecology and Environment of The People's Republic of China, Nanjing (CN)

( * ) Notice: Subject to any disclaimer, the term of this patent is extended or adjusted under 35 U.S.C. 154(b) by 245 days.

(21) Appl. No.: 17/417,333

(22) PCT Filed: Dec. 26, 2019

(86) PCT No.: PCT/CN2019/128559
§ 371 (c)(1),
(2) Date: Jun. 22, 2021

(87) PCT Pub. No.: WO2020/135552
PCT Pub. Date: Jul. 2, 2020

(65) Prior Publication Data
US 2022/0048799 A1   Feb. 17, 2022

(30) Foreign Application Priority Data
Dec. 29, 2018 (CN) .......................... 201811638511.0

(51) Int. Cl.
 C02F 3/28 (2023.01)
 C02F 3/34 (2023.01)
 C02F 101/16 (2006.01)

(52) U.S. Cl.
 CPC .............. *C02F 3/2806* (2013.01); *C02F 3/28* (2013.01); *C02F 3/34* (2013.01); *C02F 2101/163* (2013.01); *C02F 2101/166* (2013.01)

(58) Field of Classification Search
 CPC .. C02F 3/2806; C02F 3/28; C02F 3/34; C02F 2101/163; C02F 2101/166
 (Continued)

(56) References Cited

U.S. PATENT DOCUMENTS

| 4,956,082 A | * | 9/1990 | Choi | ....................... C02F 3/082 210/150 |
| 2005/0258083 A1 | * | 11/2005 | Miller | ..................... C02F 3/082 210/150 |

FOREIGN PATENT DOCUMENTS

| CN | 1654362 A | 8/2005 |
| CN | 101913696 A | 12/2010 |

(Continued)

OTHER PUBLICATIONS

Machine-generated English translation of CN 113354089, generated on May 4, 2023.*

(Continued)

*Primary Examiner* — Fred Prince (57) ABSTRACT

Disclosed is a rotating cored-type biological treatment device for wastewater with low carbon content and use thereof. The device includes a composite frame (1), several biological packing columns (2), a rotating tray (3), a rotating shaft, and a base (4), wherein the biological packing columns (2) are detachably mounted inside the composite frame (1); the rotating shaft is vertically arranged on the base (4) and can rotate; the rotating tray (3) is fixedly sheathed on (Continued)

the rotating shaft, and the composite frame (1) is disposed on the rotating tray (3); and the rotating tray rotates with the rotating shaft, which driving the composite frame (1) and the biological packing columns (2) therein to rotate. The rotating cored-type biological treatment device has the advantages of high efficiency and being renewable and environment-friendly, etc.

10 Claims, 4 Drawing Sheets

(58) Field of Classification Search
USPC .................................. 210/615, 619, 150, 151
See application file for complete search history.

(56) References Cited

FOREIGN PATENT DOCUMENTS

| | | | |
|---|---|---|---|
| CN | 102515359 | A | 6/2012 |
| CN | 105129994 | A | 12/2015 |
| CN | 106698648 | A | 5/2017 |
| CN | 206666164 | U | 11/2017 |
| CN | 109384318 | A | 2/2019 |
| CN | 209338226 | U | 9/2019 |
| CN | 113354089 | A * | 9/2021 |
| WO | WO03045848 | A2 | 6/2003 |
| WO | WO2005005326 | A1 | 1/2005 |

OTHER PUBLICATIONS

Machine-generated English translation of CN 106698648, generated on May 4, 2023.*

* cited by examiner

ROTATING CORED-TYPE BIOLOGICAL TREATMENT DEVICE OF LOW-CARBON-SOURCE WASTEWATER AND USAGE METHOD THEREFOR

TECHNICAL FIELD

The present invention belongs to the field of wastewater treatment, relates to a treatment device for wastewater with low carbon content, and in particular, to a rotating cored-type biological treatment device for treating wastewater with low carbon content and a usage method therefor.

BACKGROUND

Nitrate is the major pollution indicator in ground water and surface water pollution all over China, and it has a tendency to increase year by year. Nitrate and nitrite can be converted in vivo into nitrosamines that cause cancers, mutations and malformation. Hence, it is necessary to reduce the concentration of nitrate in tail water from sewage treatment plants and polluted water, such that water reaches water quality standards in a water functional zone.

In recent years, the discharge of wastewater with low carbon content has been increasing, and wastewater treatment hardly meets the demand of organic carbon sources for denitrification in conventional denitrogenation processes, resulting in low denitrogenation efficiency. Moreover, in the face of energy crisis, water shortage, resource utilization of wastewater has become a trend of social development. Therefore, organic matter in wastewater having a higher content of organic carbon sources is more likely to be converted into energy gas methane through anaerobic fermentation for utilization. This treatment cannot effectively remove nitrogen, so that wastewater having been subjected to anaerobic pretreatment is turned into low carbon to nitrogen ratio wastewater with low organic matter and high nitrogen contents. In summary, whether it is the objective lack of organic carbon sources in wastewater or the further consumption of organic carbon sources in anaerobic energy generation, external carbon sources need to be added to provide carbon and energy for the growth of microorganisms, and denitrifying bacteria use this energy to have a denitrification reaction to reduce nitrate contained in water. Existing external carbon sources can be substantially divided into three categories: traditional carbon sources based on liquid organic matter, biodegradable high-molecular polymers and natural cellulose. In a conventional biological denitrogenation and post-denitrification process, liquid organic matter, such as methanol or ethanol, is mainly added as the carbon source. The liquid carbon source has the problems of being difficult to control the addition amount, fast in reaction and prone to excessive addition, incomplete reaction, and even may further cause secondary pollution. The artificially-synthesized high-molecular polymer has the advantages of stable carbon release and high denitrogenation efficiency, but the high cost affects its wide application in practical engineering. The natural cellulose material has been broadly accepted by scholars due to its characteristics, e.g., high yield, low price, ease of acquisition and excellent treatment effect.

There are few existing technologies for the biological treatment of wastewater with low carbon content. Chinese patent publication No. CN102515359A disclosed a preparation method of a natural hollow netty plant solid carbon source for bio-denitrification, which is to place wrapped loofah sponge in a hollow stuffing ball which is made from an organic fiber so as to obtain the natural hollow netty plant solid carbon source for bio-denitrification. The biofilm formation packing cannot provide a good cutting effect for bubbles and water flow, and thus cannot effectively increase the oxygen transfer rate and oxygen utilization rate. In addition, the biofilm packing has no uniform gas distribution or water distribution, so that the biofilm cannot sufficiently contact pollutants in wastewater and is prone to blockage, agglomeration, etc. after being used for a period of time, and the treatment effect is affected. Some scholars have suggested that PAN-based activated carbon fiber felt as an inner core is wrapped by a superfine organic fiber wrapping layer with good water and air permeability and high mechanical strength to prepare a bundled filament composite packing of a "looped pile+wrapping layer+inner core" sandwich structure, and the filament composite packing is fixed to a stainless steel support to form a suspension type fixed bed to be used to trial research in life wastewater treatment. The activated carbon fiber is high in preparation cost, complex in process and cannot be reused, and thus the wide application thereof in practical engineering is limited.

SUMMARY

The present invention provides a rotating cored-type biological treatment device for treating wastewater with low carbon content and a usage method therefor, to overcome the disadvantages in the prior art.

To achieve the above objectives, the present invention provides a rotating cored-type biological treatment device for treating wastewater with low carbon content. The device includes a composite frame, several biological packing columns, a rotating tray, a rotating shaft, and a base, wherein the composite frame includes a composite frame skeleton, the top side of the composite frame skeleton can be opened or closed; each of the biological packing columns includes a carbon rod, a sleeve, a fiber layer, and several blades; the carbon rod is installed inside the sleeve, and the sleeve has a hollowed-out surface; the fiber layer is wrapped around the sleeve, and the sleeve can be withdrawn from the fiber layer; and the blades are located on the outer side of the fiber layer and are arranged vertically; the biological packing columns are detachably mounted inside the composite frame; the rotating shaft is vertically arranged on the base and can rotate; the rotating tray is fixedly sheathed on the rotating shaft, and the composite frame is disposed on the rotating tray; and the rotating tray rotates with the rotating shaft, which driving the composite frame and the biological packing columns therein to rotate.

Further, the rotating cored-type biological treatment device for treating wastewater with low carbon content of the present invention can further have the features: the bottom side of the composite frame is provided with several composite frame rings, and the top side of the composite frame is provided with several composite frame hooks; the composite frame rings and the composite frame hooks are both equal to the biological packing columns in number and correspond one to one; the bottom end of the biological packing column is provided with a packing column hook, and the top end thereof is provided with a packing column ring; the packing column hook at the bottom end of the biological packing column is hooked on the composite frame ring at the bottom side of the composite frame, and the packing column ring at the top end is hung by the composite frame hook at the top side of the composite frame.

Further, the rotating cored-type biological treatment device for treating wastewater with low carbon content of the present invention can further have the features: the biological packing column further includes a packing column skeleton; the sleeve is detachably fixed in the center of the packing column skeleton; the fiber layer is fixed in the packing column skeleton and is wrapped around the sleeve; and the outer side of the packing column skeleton is provided with blade frames, and the blades are covered on the blade frames.

Further, the rotating cored-type biological treatment device for treating wastewater with low carbon content of the present invention can further have the features: every three blades form a blade group; in each of the blade groups, the blade in the middle is perpendicular to the fiber layer, and the other blades on the two sides are inclined and arranged symmetrically to each other; and these blade groups are evenly distributed on the outer side of the fiber layer.

Further, the rotating cored-type biological treatment device for treating wastewater with low carbon content of the present invention can further have the features: the center of bottom side of the composite frame is provided with a shaft cap protruding towards the interior of the composite frame; the shaft cap is a cover with an opening facing down and is provided with an internal thread; the top end of the rotating shaft is provided with an external thread; and the shaft cap is in threaded connection with the top end of the rotating shaft, so as to fix relative positions of the composite frame and the rotating tray.

Further, the rotating cored-type biological treatment device for treating wastewater with low carbon content of the present invention can further have the features: the composite frame further includes a diamond mesh, the diamond mesh is covered on the lateral side of the composite frame skeleton, and the material of the diamond mesh is polyethylene.

Further, the rotating cored-type biological treatment device for treating wastewater with low carbon content of the present invention can further have the features: a method for preparing the carbon rod includes: burning crop waste into carbon solid, then soaking the carbon solid in $H_2SO_4$—$KMnO_4$ solution, and compressing molding by post-treatment after soaking.

Further, the rotating cored-type biological treatment device for treating wastewater with low carbon content of the present invention can further have the features: the method for preparing the carbon rod specifically includes: step 1: crushing crop waste; step 2: heating the crushed crop waste to 800° C. in a carbonization machine to burn it into carbon solid; step 3: soaking the carbon solid in $H_2SO_4$—$KMnO_4$ solution for 24 h, at the mass ratio of the carbon solid to $H_2SO_4$—$KMnO_4$ solution of 4:1, wherein $H_2SO_4$—$KMnO_4$ solution is formed by mixing 1 mol/L $KMnO_4$ and 1.84 mg/L $H_2SO_4$ at the volume ratio of 50:1, and after soaking ends, washing with deionized water, and drying; and step 4: mixing the carbon solid and natural rubber at the volume ratio of 4:1, and then compressing molding by using a compressor.

Further, the rotating cored-type biological treatment device for treating wastewater with low carbon content of the present invention can further have the features: the fiber layer is fabricated by interweaving several fibers, and the fibers of the fiber layer are enhanced polyacrylonitrile hollow fibers; the surfaces of the carbon rod and the fibers of the fiber layer are all coated with a biofilm; and the biofilm is formed by performing biofilm formation treatment on the biological packing column.

The present invention further provides a usage method of the rotating cored-type biological treatment device for treating wastewater with low carbon content. The method includes: placing the device in the wastewater, and turning on an actuator to drive the rotating shaft to rotate at a speed of 3 r/min; the operation cycle of the device is 3 months, and every 3 months, taking the device out of the wastewater, opening the top side of the composite frame, taking out the biological packing columns to be subjected to recycling treatment, reloading the biological packing columns into the composite frame after treatment for a next cycle of operation; and the process of recycling treatment includes: pulling out the sleeve of the biological packing column, replacing a newly fabricated carbon rod, cleaning the fiber layer, and performing biofilm formation treatment.

The present invention has the following beneficial effects. (1) Diversity of biofilm carriers: the enhanced polyacrylonitrile hollow fibers are excellent biofilm carrier and has a large specific surface area, and meanwhile a natural cellulose carbon source packing can serve as a biofilm formation carrier and can also supplement the carbon source. The carbon source provided by this technology is a natural plant fiber material with an excellent biocompatibility, and microorganisms can directly grow and reproduce on the biodegradable natural fiber material. (2) Availability of microorganisms: under the rotation, all the microorganisms can be sufficiently contacted with the wastewater in an inflow direction, thereby increasing the contact area of the biofilm and the wastewater and improving denitrogenation efficiency. (3) Good biodegradability: the carbon source in the device is a natural cellulose carbon source, e.g., straw, reed and loofah. In the wastewater treatment process, after degradation, the internal carbon source can be provided for a denitrification reaction without causing secondary pollution. (4) Practicability and flexibility: the device is assembled to be fixed, the biological packing column can be demounted to be cleaned, and when the carbon rod in the device is consumed up, a new one can be reloaded, which is quite convenient. After pulling out the sleeve, reloading sufficient carbon source and then pushing the sleeve into the fiber layer, the cored-type biological packing column that can provide the carbon source continuously is formed. (5) The device is simple, easy to use and low in cost, and the fixed carbon source for the cellulose material belongs to a natural renewable resource and is high in yield, low in price and easy to obtain. Therefore, the device can be applied to the treatment of low carbonaceous municipal wastewater and the water purification and water environment curing of rivers, lakes and ponds on a large scale. The device of present invention has the advantages of high efficiency and being renewable and environment-friendly, etc.

DETAILED DESCRIPTION

The specific embodiments of the present invention are illustrated with reference to the accompanying drawings as below.

Figure 1:
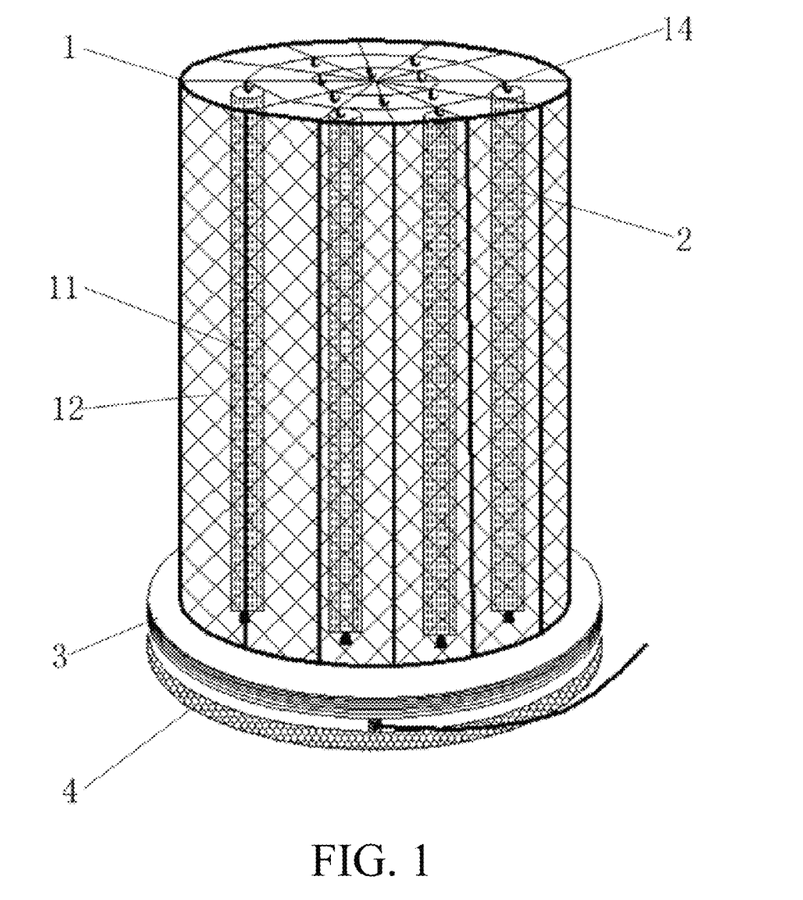
FIG. 1 is a schematic structural diagram of a rotating cored-type biological treatment device for wastewater with low carbon content.

As shown in FIG. 1, the present invention provides a rotating cored-type biological treatment device for treating wastewater with low carbon content. The device includes a composite frame 1, twelve biological packing columns 2, a rotating tray 3, a rotating shaft and a base 4.

In FIG. 1, the composite frame 1 includes a composite frame skeleton 11 and a diamond mesh 12. The composite frame skeleton 11 is a hollowed-out frame formed by a fixed combination of several prisms. The composite frame skeleton 11 is in a cylindrical shape, with the top side being able to be opened or closed. The diamond mesh 12 is covered on the lateral side of the composite frame skeleton 11.

The material of the composite frame skeleton 11 is stainless steel, and the material of the diamond mesh 12 is polyethylene.

The diameter of the composite frame 1 is 60 cm, and the height is 80 cm. The diameter of the stainless steel prism of the composite frame skeleton 11 is 1 cm.

Figure 2:
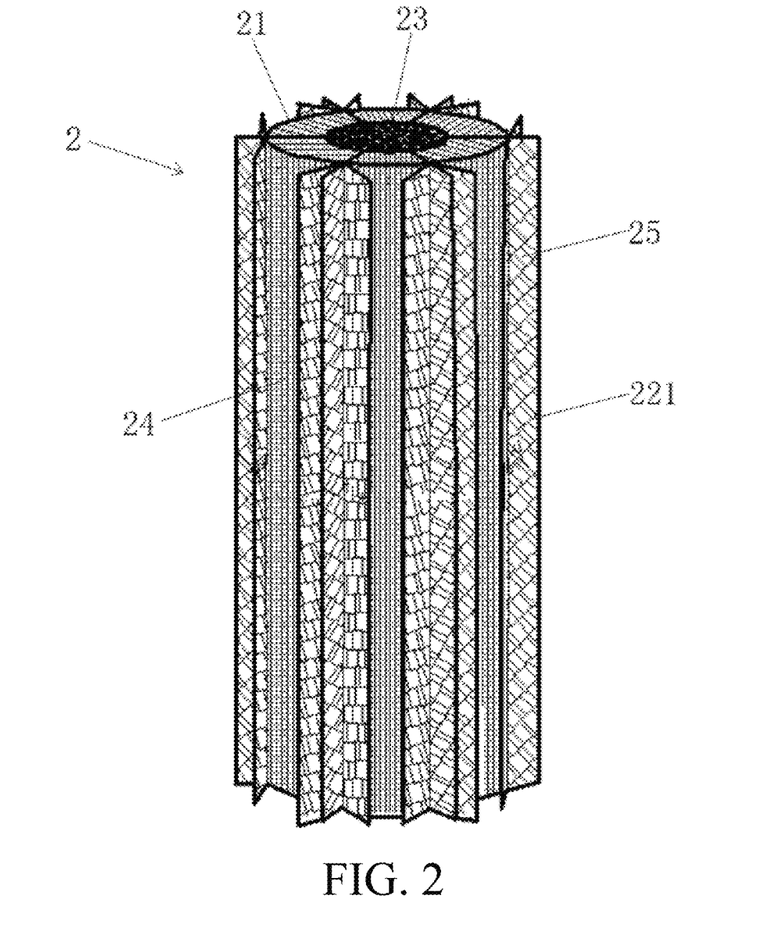
FIG. 2 is a schematic structural diagram of biological packing column 2 without packing column ring.
Figure 3:
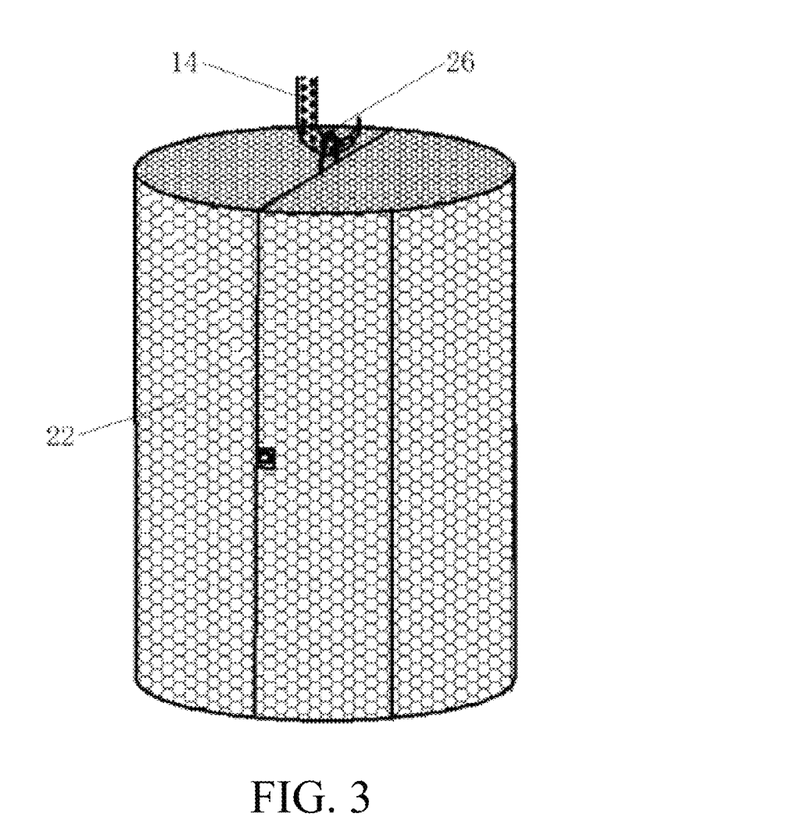
FIG. 3 is a schematic structural diagram of sleeve 22 of biological packing column 2.
Figure 4:
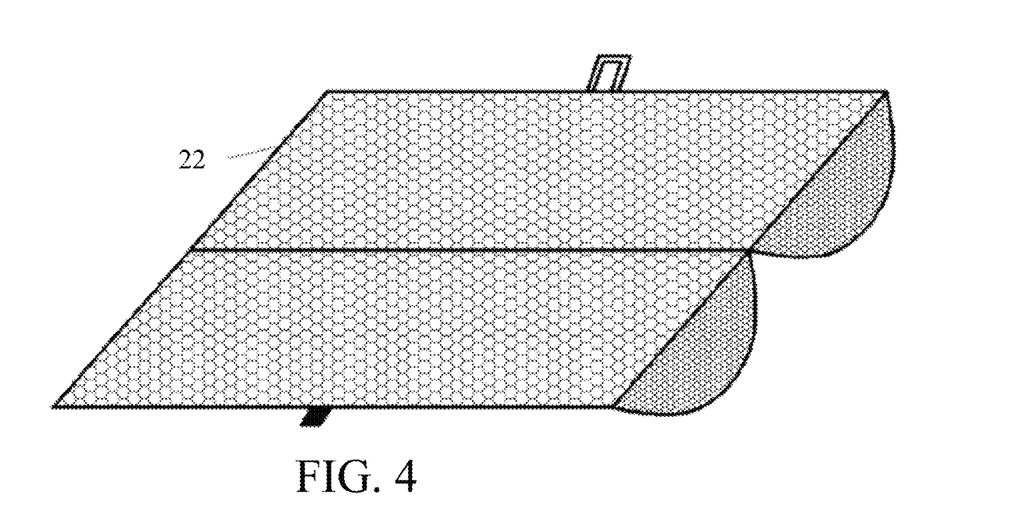
FIG. 4 is a schematic diagram of sleeve 22 of biological packing column 2 in an opened state.

As shown in FIG. 2-4, the biological packing column 2 includes a packing column skeleton 21, a sleeve 22, a carbon rod 23, a fiber layer 24 and several blades 25.

The packing column skeleton 21 is a hollowed-out frame formed by a fixed combination of several prisms, which is used for fixing and assembling other structures. The material of the packing column skeleton 21 is ABS plastic.

As shown in FIG. 3 and FIG. 4, the sleeve 22 can be opened from the lateral side, and the carbon rod 23 is installed inside the sleeve 22. The sleeve 22 has a hollowed-out surface. The sleeve 22 is detachably fixed in the center of the packing column skeleton 21, so as to be pulled out to replace the carbon rod 23.

A method for preparing the carbon rod 23 specifically includes the following steps. Step 1: Crush crop waste. The crop waste may be straw, rice husk, vegetable sponges, and the like. Step 2: Heat the crushed crop waste to 800° C. in a carbonization machine to burn it into carbon solid. Step 3: Soak the carbon solid in $H_2SO_4$—$KMnO_4$ solution for 24 h, at the mass ratio of the carbon solid to $H_2SO_4$—$KMnO_4$ solution of 4:1. $H_2SO_4$—$KMnO_4$ solution is formed by mixing 1 mol/L $KMnO_4$ and 1.84 mg/L $H_2SO_4$ at the volume ratio of 50:1. After soaking, washing is performed with deionized water and drying. Step 4: Mix the carbon solid and natural rubber at the volume ratio of 4:1, and then perform compressing molding by using a compressor.

The carbon rod 23 has the diameter of 5 cm, and the height is less than the height of the composite frame 1.

The fiber layer 24 is fabricated by interweaving several fibers. The fiber layer 24 is fixed in the packing column skeleton 21 and wrapped around the sleeve 22. The fibers of the fiber layer 24 are enhanced polyacrylonitrile hollow fibers.

The outer side of the packing column skeleton 21 is provided with blade frames 221 vertically arranged, and the blades 25 are covered on the blade frames 221. Every three blades 25 form a blade group. In the blade group, the blade 25 in the middle is perpendicular to the fiber layer 24, and the other blades 25 on the two sides are inclined and arranged symmetrically to each other. The six blade groups are evenly distributed on the outer side of the fiber layer 24.

The surfaces of the carbon rod 23 and the fibers of the fiber layer 24 are all coated with a biofilm. The biofilm is formed by performing biofilm formation treatment on the biological packing column 2.

A specific process of biofilm formation treatment is as follows: a large biofilm reactor is used as a vessel, at room temperature and an oxygen concentration of 0.1 mg/L, activated sludge in an anaerobic filter in a municipal sewage treatment plant is selected as inoculated sludge, the activated sludge is mixed with a self-made anaerobic broth at the volume ratio of 1:2, the fabricated cored-type biological packing columns are added for standing for 24 h, a part of supernatant in the vessel is withdrawn, and the equal amount of activated sludge is supplemented for standing for additional 24 h. Then, low carbonaceous urban wastewater flows in at a flow rate of 0.5 $m^3$/h in a continuous inflow mode, inflow is stopped after continual inflow for 7 days, the biofilm reactor runs for 24 h in a closed state without inflow and outflow, the inflow rate is continuously increased from a small flow rate of 0.5 $m^3$/h to 2 $m^3$/h, and the total nitrogen and COD of inflow and outflow is detected every day, growth conditions of microorganisms are observed, and after a removal rate of the total nitrogen reaches 20%, a removal rate of the COD reaches 50% and the device can run for one week stably, it is shown that biofilm formation is completed.

Figure 5:
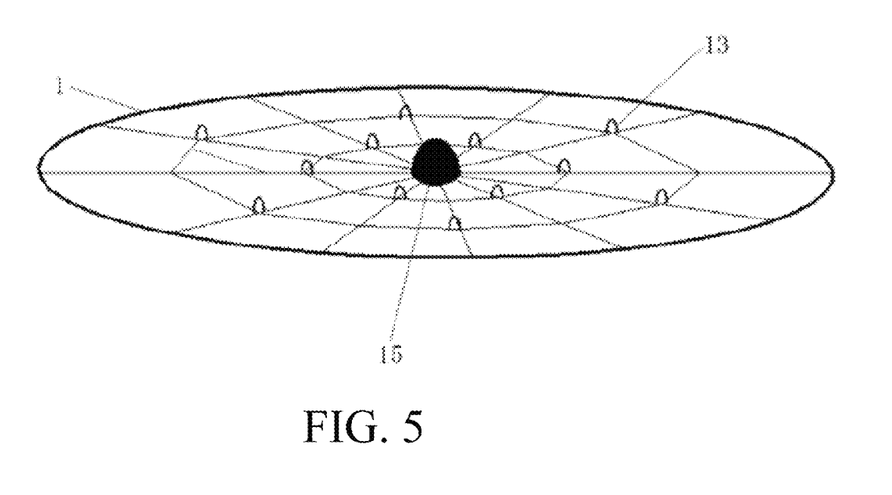
FIG. 5 is a schematic structural diagram of the bottom side of a composite frame.

As shown in FIG. 1 and FIG. 5, the bottom side of the composite frame 1 is provided with twelve composite frame rings 13, and the top side thereof is provided with twelve composite frame hooks 14. The composite frame rings 13 and the composite frame hooks 14 are both equal to the biological packing columns 2 in number and correspond one to one.

The bottom end of the sleeve 22 of the biological packing column 2 is provided with a packing column hook, and the top end of the sleeve 22 is provided with a packing column ring 26.

The packing column hook at the bottom end of the biological packing column 2 is hooked on the composite frame ring 13 at the bottom side of the composite frame 1, and the packing column ring 26 at the top end of the biological packing column is hung by the composite frame hook 14 at the top side of the composite frame 1, such that the biological packing column 2 is mounted inside the composite frame 1. During mounting, the packing column hook is hooked on the composite ring 13 first, and the top side of the composite frame 1 is then closed. Since the top side of the composite frame 1 is a hollowed-out skeleton, the packing column ring 26 at the top end of the biological packing column 2 in the composite frame 1 can be hooked by the composite frame hook 14 with a hand or a tool passing through a void in the top side of the composite frame 1.

The rotating shaft is vertically arranged in the center of the base 4 and can rotate under the driving of an actuator, e.g., a motor. The top end of the rotating shaft is provided with an external thread. The center of the rotating tray 3 is fixedly sheathed on the rotating shaft.

As shown in FIG. 5, the center of the bottom side of the composite frame 1 is provided with a shaft cap 15 protruding towards the interior of the composite frame 1. The shaft cap 15 is a cover with an opening facing down and is provided with an internal thread.

The composite frame 1 is disposed on the rotating tray 3, and the shaft cap 15 is in threaded connection with the top end of the rotating shaft, to fix relative positions of the composite frame 1 and the rotating tray 3.

The rotating tray 3 rotates with the rotating shaft, which driving the composite frame 1 and the biological packing columns 2 therein to rotate.

The method for using the rotating cored-type biological treatment device for wastewater with low carbon content includes:

placing the device in the wastewater, and starting an actuator to drive the rotating shaft to rotate at a speed of 3 r/min; and the operation cycle of the device is set to 3 months, every 3 months, taking the device out of the wastewater, opening the top side of the composite frame 1, taking out the biological packing columns 2 to be subjected to recycling treatment, reloading the biological packing columns into the composite frame after treatment for a next cycle of operation.

The process of recycling treatment of the biological packing column 2 includes: pulling out the sleeve 22 of the biological packing column 2, replacing a newly fabricated carbon rod 23, cleaning the fiber layer 24, and performing biofilm formation treatment.

In the running process, the carbon rod 23 continuously provides a growth carbon source for microorganisms for biofilm formation on the fiber layer 24, such that the microorganisms uniformly adhere to and grow on the fiber column to form a stable biofilm, and the denitrogenation rate of the microorganisms is increased. Meanwhile, the composite frame 1 continuously rotates, such that the microorganisms on the carbon rod 23 and the fiber layer 24 are sufficiently utilized. The biofilm on the carbon rod 23 and the fiber layer 24 is in uniform and sufficient contact with the wastewater, and has a remarkable effect of purifying the wastewater. Furthermore, the blade 25 can intercept large particles and plant or animal residues in the wastewater, preventing their migration with the water flow from causing damage to the biofilm on the fiber layer 24 and affecting the purification effect of the biofilm. Concurrently, when the device rotates, the blade 25 can cut water flow and bubbles, such that conditions are created to improve turbulence of a gas phase and a liquid phase, and gas-liquid, solid-liquid and gas-solid mass transfer is promoted.

When used to treat the low carbonaceous urban wastewater in the sewage treatment plant, the device continuously runs for 3 months, and the wastewater in treatment is monitored every week, to ensure that the device runs stably and keeps a higher treatment rate. Monitoring results are shown in Table as below.

| Detection index | COD (mg/L) | TN (mg/L) | Ammonia nitrogen (mg/L) | Nitrate nitrogen (mg/L) | PH |
|---|---|---|---|---|---|
| Before treatment | 90.5-150 | 24.2-31.2 | 22.9-30.2 | 0.2-0.9 | 7.0-7.5 |
| After treatment | 19.67±6.04 | 10.93±3.5 | 5±3.42 | 0.5±0.2 | 7.2±0.2 |

It can be seen from the table, after the treatment of low carbonaceous urban sewage by the present device, the total nitrogen and ammonia nitrogen have reached a high removal effect, and the removal rate of total nitrogen and ammonia nitrogen has reached about 80%, and other water quality indicators have also maintained high removal rate.

What is claimed is:

1. A rotating cored-type biological treatment device for wastewater with carbon content, comprising:

a composite frame, several biological packing columns, a rotating tray, a rotating shaft and a base;

wherein the composite frame comprises a composite frame skeleton, and a top side of the composite frame skeleton is able to be opened or closed;

each of the biological packing columns comprises a carbon rod, a sleeve, a fiber layer, and several blades;

the carbon rod is installed inside the sleeve, and the sleeve has a hollowed-out surface;

the fiber layer is wrapped around the sleeve, and the sleeve is able to be withdrawn from the fiber layer;

the blades are located on an outer side surface of the fiber layer and are arranged vertically;

the biological packing columns are detachably mounted inside the composite frame;

the rotating shaft is vertically arranged on the base and can rotate;

the rotating tray is fixedly sheathed on the rotating shaft, and the composite frame is disposed on the rotating tray; and the rotating tray rotates with the rotating shaft, which driving the composite frame and the biological packing columns therein to rotate.

2. The rotating cored-type biological treatment device for wastewater with carbon content according to claim 1, wherein:

a bottom side of the composite frame is provided with several composite frame rings, and the top side of the composite frame is provided with several composite frame hooks;

the composite frame rings and the composite frame hooks are both equal to the biological packing columns in number and correspond one to one; a bottom end of the biological packing column is provided with a packing column hook, and a top end thereof is provided with a packing column ring; and the packing column hook at the bottom end of the biological packing column is hooked on the composite frame ring at the bottom side of the composite frame, and the packing column ring at the top end is hung by the composite frame hook at the top side of the composite frame.

3. The rotating cored-type biological treatment device for wastewater with carbon content according to claim 1, wherein:

the biological packing column further comprises a packing column skeleton;

the sleeve is detachably fixed in a center of the packing column skeleton;

the fiber layer is fixed in the packing column skeleton and is wrapped around the sleeve; and an outer side of the packing column skeleton is provided with blade frames, and the blades are covered on the blade frames.

4. The rotating cored-type biological treatment device for wastewater with carbon content according to claim 1, wherein:

every three blades form a blade group;

in each of the blade group, the blade in the middle is perpendicular to the fiber layer, and the other blades on two sides are inclined and arranged symmetrically to each other; and several blade groups are evenly distributed on an outer side of the fiber layer.

5. The rotating cored-type biological treatment device for wastewater with carbon content according to claim 1, wherein:

a center of the bottom side of the composite frame is provided with a shaft cap protruding towards an interior of the composite frame;

the shaft cap is a cover with an opening facing down and is provided with an internal thread;

a top end of the rotating shaft is provided with an external thread; and the shaft cap is in threaded connection with the top end of the rotating shaft, to fix relative positions of the composite frame and the rotating tray.

6. The rotating cored-type biological treatment device for wastewater with carbon content according to claim 1, wherein:

the composite frame further comprises a diamond mesh, and the diamond mesh is covered on a lateral side of the composite frame skeleton; and the material of the diamond mesh is polyethylene.

7. The rotating cored-type biological treatment device for wastewater with carbon content according to claim 1, wherein:

a method for preparing the carbon rod comprises: burning crop waste into carbon solid, then soaking the carbon solid in $H_2SO_4$—$KMnO_4$ solution, and compressing molding by post-treatment after soaking.

8. The rotating cored-type biological treatment device for wastewater with carbon content according to claim 7, the method for preparing the carbon rod specifically comprises:

step 1: crushing crop waste;

step 2: heating the crushed crop waste to 800° C. in a carbonization machine to burn it into carbon solid;

step 3: soaking the carbon solid in $H_2SO_4$—$KMnO_4$ solution for 24 h, at the mass ratio of the carbon solid to $H_2SO_4$—$KMnO_4$ solution of 4:1;

wherein $H_2SO_4$—$KMnO_4$ solution is formed by mixing 1 mol/L $KMnO_4$ and 1.84 mg/L $H_2SO_4$ at the volume ratio of 50:1, after soaking, the carbon solid is washed with deinozed water, and dried; and step 4: mixing the carbon solid and natural rubber at the volume ratio of 4:1, and then compressing molding by using a compressor.

9. The rotating cored-type biological treatment device for wastewater with carbon content according to claim 1, wherein:

the fiber layer is fabricated by interweaving several fibers, and the fibers of the fiber layer are enhanced polyacrylonitrile hollow fibers;

the surfaces of the carbon rod and the fibers of the fiber layer are all coated with a biofilm; and the biofilm is formed by performing biofilm formation treatment on the biological packing column.

10. A usage method of the rotating cored-type biological treatment device for wastewater with carbon content according to claim 1, comprising:

placing the device in the wastewater, and turning on an actuator to drive the rotating shaft to rotate at a speed of 3 r/min; and an operation cycle of the device is 3 months, and every 3 months, taking the device out of the wastewater, opening the top side of the composite frame, taking out the biological packing columns to be subjected to recycling treatment, reloading the biological packing columns into the composite frame after treatment for a next cycle of operation; and a process of recycling treatment of the biological packing column comprises: pulling out the sleeve of the biological packing column, replacing a newly fabricated carbon rod, cleaning the fiber layer, and performing biofilm formation treatment.

\* \* \* \* \*